United States Patent
Desanaux et al.

(10) Patent No.: US 7,473,388 B2
(45) Date of Patent: Jan. 6, 2009

(54) METHOD OF PRODUCING A POLYESTER RESIN CONTAINER AND DEVICE FOR PERFORMING SAME

(75) Inventors: Christophe Desanaux, Vittel (FR); Alain Contal, Epinal (FR); Gerard Denis, Reims (FR)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 271 days.

(21) Appl. No.: 10/513,292

(22) PCT Filed: May 2, 2003

(86) PCT No.: PCT/FR03/01375

§ 371 (c)(1),
(2), (4) Date: May 6, 2005

(87) PCT Pub. No.: WO03/095179

PCT Pub. Date: Nov. 20, 2003

(65) Prior Publication Data

US 2005/0206045 A1    Sep. 22, 2005

(30) Foreign Application Priority Data

May 3, 2002 (FR) .................................. 02 05583

(51) Int. Cl.
*B29C 49/46* (2006.01)

(52) U.S. Cl. ...................... 264/524; 264/570; 425/526

(58) Field of Classification Search .................. 264/524, 264/570; 425/526
See application file for complete search history.

(56) References Cited

U.S. PATENT DOCUMENTS 4,039,641 A    8/1977  Collins
4,539,172 A  * 9/1985  Winchell et al. ............ 264/515

FOREIGN PATENT DOCUMENTS

| DE | 198 03 909 | 8/1999 |
| EP | 0 081 883 | 6/1983 |
| FR | 1 430 316 | 3/1966 |
| FR | 2 798 093 | 3/2001 |

OTHER PUBLICATIONS

Patent Abstracts of Japan vol. 013, No. 041 (M-791) Jan. 30, 1989—& JP 63 249616 A (Komatsu Ltd), Oct. 17, 1988 abstract—& Database WPI Week 198847 Derwent Publications Ltd., London, GB; AN 1988-335238 XP002226520 & JP 63 249616 A abstract.
Patent Abstracts of Japan vol. 006, No. 216 (M-168), Oct. 29, 1982—& JP 57 123027 A (Pentel KK), Jul. 31, 1982 abstract—& Database WPI Week 198236 Derwent Publications Ltd., London, GB; AN 1982-75423E XP002226519 & JP 57 123027 A abstract.

* cited by examiner

*Primary Examiner*—Suzanne E. McDowell
(74) *Attorney, Agent, or Firm*—Young & Thompson

(57) ABSTRACT

Method of producing a polyester resin container, such as a PET bottle, from a preform (10) includes a step whereby the preform (10) is heated to a temperature above a glass-transition temperature and a drawing step which is performed in a cavity (101). According to the invention, during the drawing step, an incompressible fluid and not a gaseous fluid is injected through the opening in the preform (10').

10 Claims, 1 Drawing Sheet

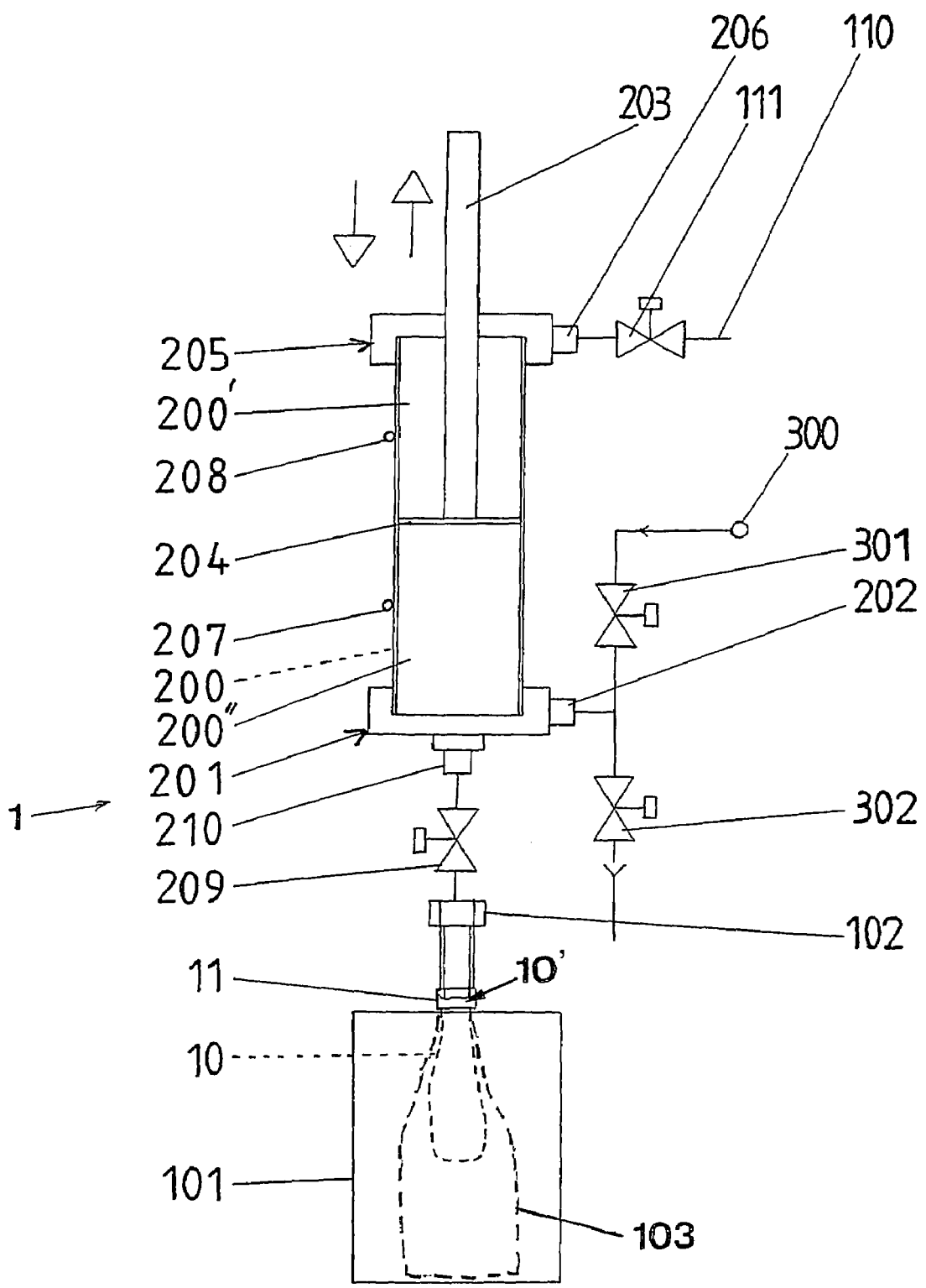

METHOD OF PRODUCING A POLYESTER RESIN CONTAINER AND DEVICE FOR PERFORMING SAME

The present invention relates to the field of production of containers of polymeric material, particularly of polyester. More particularly, it relates to the field of production of polyester bottles, preferably of polyethylene terephthalate (PET), containing a liquid, preferably water and especially mineral water.

The present invention has for its object a process for the production of a container of polyester by injection of liquid into a preform. It also has for its object a device for practicing this process.

For many years, PET bottles that are conventionally found in commerce are produced by blowing or blow-drawing, with compressed air, from PET preforms.

A preform is usually in the form of a cylindrical tube closed at one of its ends and open at its opposite end. The head of the preform, which is open, corresponds to the neck of the container. In the course of the conventional procedure for production of a container from a preform, the preforms are threaded, head to bottom, on cylindrical lugs of a continuous conveyor chain which thus transports the preforms through an oven, essentially constituted by a rectilinear section bordered on each side by radiation heating means, so as to raise the temperature of the plastic material for the subsequent step of blow-drawing.

The hot preform is then removed and transported to a mould of a blowing machine. The transport movement is carried out by a transfer arm for example, and is coordinated with that of the blowing machine which is generally in the form of a rotatable carousel turning continuously about its vertical axis and which carries, at its periphery, a series of identical moulds. Thus, the preform is disposed in the mould immediately after this is opened and the previous form content has been removed.

The preform is first heated so as to be in the mould at a temperature higher than the vitreous transition temperature (about 100° C.) so as to permit the shaping by blow-drawing. The temperature of the preform at the end of the heating step is slightly greater than that within the blow mould, so as to take account of the cooling which takes place over the distance existing between the heating place and the blowing place. Thanks to a rotating movement and the simultaneous presence of several moulds, such a blowing machine permits producing containers at a very high rate, of the order of several dozens of thousands of units per hour, namely of the order of 1000 to 2000 bottles per hour and per mould.

The blow-drawing takes place by drawing with the help of a metallic rod, air injection taking place at pressures varying from 3 to 40 bars ($3.10^5$ Pa to $4.10^6$ Pa). The air is injected through a nozzle whose end is introduced through the opening of the head of the preform.

The bottles produced by air injection under pressure have a relatively satisfactory lifetime for a given weight and type of material. Nevertheless, the intrinsic characteristics and properties of PET can envisage even better results by modifying the production process of the containers.

One of the objects of the present invention is as a result to provide an improved process for the production of a polyester container from the preform.

Another object is to be able if desired to integrated the step of filling the container with the process of producing this latter.

To this end, the invention provides a process for the production of a polyester resin container from a preform present substantially in the form of a cylindrical tube, comprising an opening, preferably at the level of a neck, said process comprising a step of heating said preform to a temperature higher than the vitreous transition temperature of said polyester and a step of expansion carried out within a cavity or a mould, characterized in that, during said expansion step, an incompressible fluid is injected through the opening of said preform to form said container.

The containers obtained by this process have much better characteristics than those obtained by a blowing-drawing process of conventional type with expansion by gaseous fluid. Particularly, it has been determined that they have a longer lifetime for a given weight and type of material. The amount of crystallinity, which is to say the mass of crystalline phase relative to the total mass of polymer, of a container obtained with the process according to the invention, can be in particular much greater.

For example, in the case of PET bottles, the bottles obtained by the process according to the invention can have crystallinity comprised between 30% and 50%, which gives them greater lifetimes than bottles obtained at present for a same weight and type of PET having crystallinity comprised between 25% and 30%.

According to another aspect of the present invention, said incompressible fluid is a liquid injected under pressure, at a controlled speed and pressure, in a controlled quantity, preferably the liquid adapted to be contained in said final container to be formed.

Thus, the liquid used for the production of the contents can be the liquid to be packaged, for example water and particularly mineral water, which permits passing to a last filling step. The steps of production of containers and filling of these containers are thus integrated into a single and same step. This solution obviously provides important economic advantages and limits the risk of contamination, in particular bacterial, of the empty container.

Preferably, when said container to be formed is a PET bottle, said preform is heated to a temperature higher than the vitreous transition temperature of said PET, typically about 75° C. to 85° C., during said heating step, and the temperature of said incompressible fluid is comprised between 10° C. and 90° C. during said expansion step.

According to a preferred embodiment of the invention, said temperature of the incompressible fluid is about 15° C.

According to another aspect of the present invention, there is also provided a device to practice a process of the type which has been defined, characterized in that it comprises essentially injection means of liquid adapted to be connected to a nozzle of a known blowing or drawing installation, particularly of the conventional type with expansion by gaseous fluid.

Thus, the process according to the invention can particularly be used with an installation for the production of containers that already exist, for example a unit for the production of PET bottles of the conventional type. It suffices to modify the installation such that the blowing nozzles which are associated with the different moulds of the conventional blowing machine would be connected to means for injection of liquid according to the invention instead of gaseous fluid.

However, the process according to the invention could equally be used with a specific installation constructed for this purpose and having different elements described above.

Preferably, a control means of said liquid injection means is actuated by gas under pressure delivered by a supply line of gaseous fluid of said blowing installation or blowing-drawing installation of conventional type.

It can comprise for example a piston whose movement in a jack filled with liquid is controlled by the gaseous fluid under pressure of a blowing or blow drawing installation of conventional type. Similarly, the gaseous fluid inlets of an installation for production of containers, that already exists, for example a unit for production of PET bottles of the conventional type, is used to control the associated liquid injection means according to the invention. The conventional blowing installation thus needs overall very little modification.

Preferably, said liquid injection means is also connected to the input of a liquid supply line, preferably the liquid for filling the containers to be formed.

Similarly, as has been explained above, the liquid used for the production of the containers is the liquid to be packaged, which permits omitting a supplemental filling device. The devices for production of containers and filling these containers are thus integrated in a single and same device.

Thus, according to a preferred embodiment, the injection means consists of a cylinder/piston assembly, in which the piston forming the control means with alternate movement delimits in said cylinder, on the one hand, a control chamber connected to a supply line of air under pressure, and, on the other hand, an injection chamber for liquid connected to the input of a liquid supply line and connected to the nozzle.

The invention will be better understood from the description which follows, which relates to a preferred embodiment, given by way of non-limiting example, and explained with reference to the accompanying schematic drawing showing a device 1 for injection of liquid into a preform installed in a mould or a cavity, according to the present invention.

The embodiment described here by way of example relates to a process for the production of water bottles of PET from a heated preform. Thus, as is seen in the accompanying drawing, a preform 10 is present in the form a cylindrical tube closed at its lower end. The head 11 of the preform, which is open, corresponds to the neck of the bottle, which is to say, in this case, to the throat on which will be screwed a cap.

The process is practiced by means of modifications of a conventional installation for producing PET mineral water bottles of PET, such as described above in the introductory portion of the present text.

According to the present invention, during the expansion step, there is injected through the opening 10' of the preform 10, not air under pressure, but an incompressible fluid. There will preferably be used as incompressible fluid permitting the forming of the bottle, the liquid that this bottle will contain, so as to omit a later filling step.

So as to practice the invention, modifications are made to a conventional installation for production of PET bottles, as will be seen on the accompanying drawing.

Overall, there are connected to the blowing machine, at the level of the moulds, devices 1 for the injection of liquid, adapted to be connected to nozzles 102 associated with these moulds (one device 1 per mould).

The single figure shows in a schematic manner a mould 101 within which is enclosed the body of a preform 10. The neck 11 of the preform extends outside the mould. The blowing nozzle 102 associated with the mould is inserted through the opening 10' of the neck 11 of the preform 10.

The blowing nozzle 102 is normally connected to an air supply 110. According to the present invention, the direct connection between the air supply 110 and the nozzle 102 is disassembled. On the contrary, a device 1 for injection of liquid constituted essentially by a jack 200 is associated with the mould 101.

The cylinder/piston assembly or jack 200 comprises a cylinder body adapted to enclose hermetically both a liquid and a gas and a piston 203, 204 adapted to slide longitudinally in the body of the jack. The head 204 of the piston separates the body of the jack 200 into two compartments 200' and 200" (or chambers) hermetically sealed separated from each other, an upper compartment 200' adapted to receive air and a lower compartment 200" adapted to receive water. The upper portion 205 of the jack comprises an air inlet 206 and a lower portion 201 of the jack comprises a water inlet 202 and a water outlet 210.

The air inlet 206 is connected to the air supply 110 by means of a valve 111. The water inlet 202 is associated with a water supply system comprising a water supply 300 connected by means of a valve 301 to the water inlet 202 at the level of which a purge conduit is also provided, controlled by a valve 302. Preferably, according to the invention, the water supply system supplies mineral water adapted to be contained in the bottles. The water outlet 210 is connected to the nozzle 102 such that this latter will be supplied by the device 1 for injection of water 200.

Magnetic detectors 207 and 208 (forming position or level detectors) are installed on a jack 200 at different heights, the detector 207 acting in a lower portion 201 of the jack and the detector 208 acting in an upper portion 205 of the jack.

The valves 111, 209, 301 and 302 are controlled by control servo mechanisms directed by a central control system or automaton (not shown) of the installation for production of bottles, such that the operation of the device 1 for injection of water will be coordinated with the operation of the forming (blowing) machine and, more generally with the operation of the assembly of the installation for the production of bottles.

The operation of the water injection device 1, coordinated with the operation of the forming or blowing machine, is effected according to an injection cycle of a duration less than the duration of the rotation cycle of a mould about the axis of the forming machine.

In a first step of the injection cycle, the valve 300 is open to fill the lower portion of the jack with water until the piston head 204 is located at the level of the magnetic detector 208. When the magnetic detector 208 detects the piston head 204, the second step consisting in closing the valve 301 is executed. In a third step of the injection cycle, the valve 111 is opened so as to place the upper portion of the jack under pressure. This step is executed during a given time fixed by a timer. At the end of this step, a fourth step is executed during which the valve 209 is open. The piston 203, 204, actuated by air under pressure present in its upper portion 205, will then descend, giving rise to the injection of water through the valve 209 into the nozzle 102 and then into the preform 10 which is simultaneously stretched and inflated by the water injected until its reaches the walls 103 of the mold 101. The bottle is thus formed which, moreover, is already filled with water. This step is interrupted when the magnetic detector 207 detects the presence of the piston head 203. After a given time fixed by a timer, the valves 209 and 111 are closed. When, at the end of the rotation cycle of the mould about the axis of the blowing machine, this mould automatically opens, the bottle transfer arm removes the bottle formed and already filled.

The optimization of the process takes place for a predetermined drawing quantity, a preform temperature higher than the vitreous transition temperature of the polyester used, and a rapid speed of injection, greater than that of the cooling of the material used. Thus, another advantage is a very short cycle time, the injection time of the incompressible fluid being substantially less than one second, preferably comprised between 0.02 second and 0.5 second and more preferably between 0.1 second and 0.2 second.

So as to eliminate air bubbles that may be contained in the circuit, there is also provided a purge cycle. The starting cycle is defined by the automaton.

In a first step of the purge cycle, the valve 301 is open to fill the lower portion 201 of the jack with water until the piston head 204 is located at the level of the magnetic detector 208. When the magnetic detector 208 detects the piston head 204, the second step consisting in closing the valve 301 takes place. In a third step of the injection cycle, the valve 111 is open so as to place the upper portion of the jack under pressure. This step is executed for a given time fixed by a timer. At the end of this step, a fourth step is executed during which the purge valve 302 is open. The piston 203, 204, actuated by air under pressure present in the upper portion 205, will thus descend, giving rise to the injection of water through the valve 302. This step is interrupted when the magnetic detector 207 detects the presence of the piston head 203. After a given time fixed by a timer, the valves 302 and 111 are closed.

The temperature of the water can be comprised between 10° C. and 90° C. according to technical constraints imposed by the bottle that it is desired to produce. It is necessarily particularly that the pressure be sufficiently great to deform the preform and the lower temperatures require higher pressures. However, when the technical constraints permit, the temperature of the liquid will preferably be 15° C.

Preferably, so that the neck 11 of the preform 10 does not risk being deformed during the expansion cycle, this latter is isolated from the liquid by a sealing and/or cooling member.

The contents obtained by this process have characteristics much better than those obtained with an expansion process of the conventional type carried out with gaseous blowing. Particularly, they have a greater lifetime for a given weight and type of material. The quantity of crystallinity, which is to say the mass of the cystalline phase relative to the total mass of the polymer, of a container obtained with the process according to the invention, can particularly be much greater. The use of rapid expansion speeds permits obtaining a fairly high blowing production and an induced crystallinity which is also high.

For example, in the case of tests carried out with water at temperatures between 85° C. and 95° C. and under pressures from 2 bars to 3 bars ($2.10^5$ Pa to $3.10^5$ Pa) in the case of PET containers, the containers obtained by the process according to the invention had levels of crystallinity up to 50%. To reach this quantity, there are integrated all the non-amorphous phases, which is to say the crystalline phase and the mesophase.

Of course, the invention is not limited to the embodiment described and shown in the accompanying drawing. Modifications remain possible, particularly as to the construction of the various elements or by substitution of technical equivalents, without thereby departing from the scope of protection of the invention.

The invention claimed is:

1. Process for the production of a container of polyester resin from a preform (10) substantially in the form of a cylindrical tube comprising an opening (10') at the level of a neck (11), said process comprising a step of heating said preform (10) to a temperature higher than the vitreous transition temperature of said polyester and a step of expansion carried out within a cavity, characterized in that, during the step of expansion, a liquid is injected through the opening (10') of said preform (10) to form said container, and in that a control means (203, 204) for the liquid injection means is actuated by gas under pressure delivered by a supply line of gaseous fluid (110) of a blow molding installation.

2. Process according to claim 1, characterized in that the injection time of the liquid is comprised between 0.02 second and 0.05 second.

3. Process according to claim 1, characterized in that the liquid is injected under pressure with a controlled speed and pressure.

4. Process according to claim 1, characterized in that the injected liquid corresponds to the liquid adapted to be contained in the container.

5. Process according to claim 1, characterized in that said container to be formed is a PET bottle, and said preform (10) is heated to a temperature higher than the vitreous transformation temperature of said PET during said heating step and the temperature of said liquid is comprised between 10° C. and 90° C. during said expansion step.

6. Process according to claim 5, characterized in that said temperature of the liquid is about 15° C.

7. Process according to claim 1, characterized in that the injection time of the liquid is substantially less than one second.

8. Device (1) to produce a container of polyester resin from a preform, which comprises a liquid injection means adapted to be connected to a nozzle (102) of a blowing-drawing installation with expansion by gaseous fluid, and a control means (203, 204) of said liquid injection means that is actuated by gas under pressure delivered by a gaseous fluid supply line (110) of said blowing-drawing installation.

9. Device (1) according to claim 8, characterized in that said liquid injection means is also connected to an inlet (300) of a liquid supply line.

10. Device (1) according to claim 8, characterized in that the injection means consists of a cylinder/piston assembly in which the piston (203, 204) forming control means with alternate movement, delimits in said cylinder, on the one hand, a control chamber (200') connected to a supply line (110) of air under pressure and, on the other hand, a liquid injection chamber (200") connected to an outlet (300) of a liquid supply line and connected to the nozzle (102).

* * * * *